United States Patent

[11] 3,569,774

| [72] | Inventor | William Weigl<br>11033 Greenhaven Parkway, Brecksville, Ohio 44141 |
|---|---|---|
| [21] | Appl. No. | 834,349 |
| [22] | Filed | June 18, 1969 |
| [45] | Patented | Mar. 9, 1971 |

[54] VEHICLE LIGHT CONTROL SYSTEM WITH MEMORY SWITCHING CIRCUIT
10 Claims, 3 Drawing Figs.

| [52] | U.S. Cl. | 315/77, 315/82 |
|---|---|---|
| [51] | Int. Cl. | B60q 1/02 |
| [50] | Field of Search | 315/77, 82 |

[56] References Cited
UNITED STATES PATENTS

| 2,862,148 | 11/1958 | Weigl et al. | 315/80 |
|---|---|---|---|
| 3,125,702 | 3/1964 | Herridge, Jr. et al. | 315/82X |
| 3,337,768 | 8/1967 | Crews | 315/82 |

*Primary Examiner*—Roy Lake
*Assistant Examiner*—Palmer C. Demeo

ABSTRACT: A pushbutton-operated light switch of a motor vehicle is automatically turned off in response to opening of an ignition switch and can, if desired, be operated to again energize the lights. A second pushbutton is capable of being manually operated to extinguish the lights, whether the ignition is on or off. A memory circuit is provided to enable automatic shutoff from the ignition switch only when both the ignition switch and the lights are on, and is independent of the order in which they were turned on.

PATENTED MAR 9 1971
3,569,774
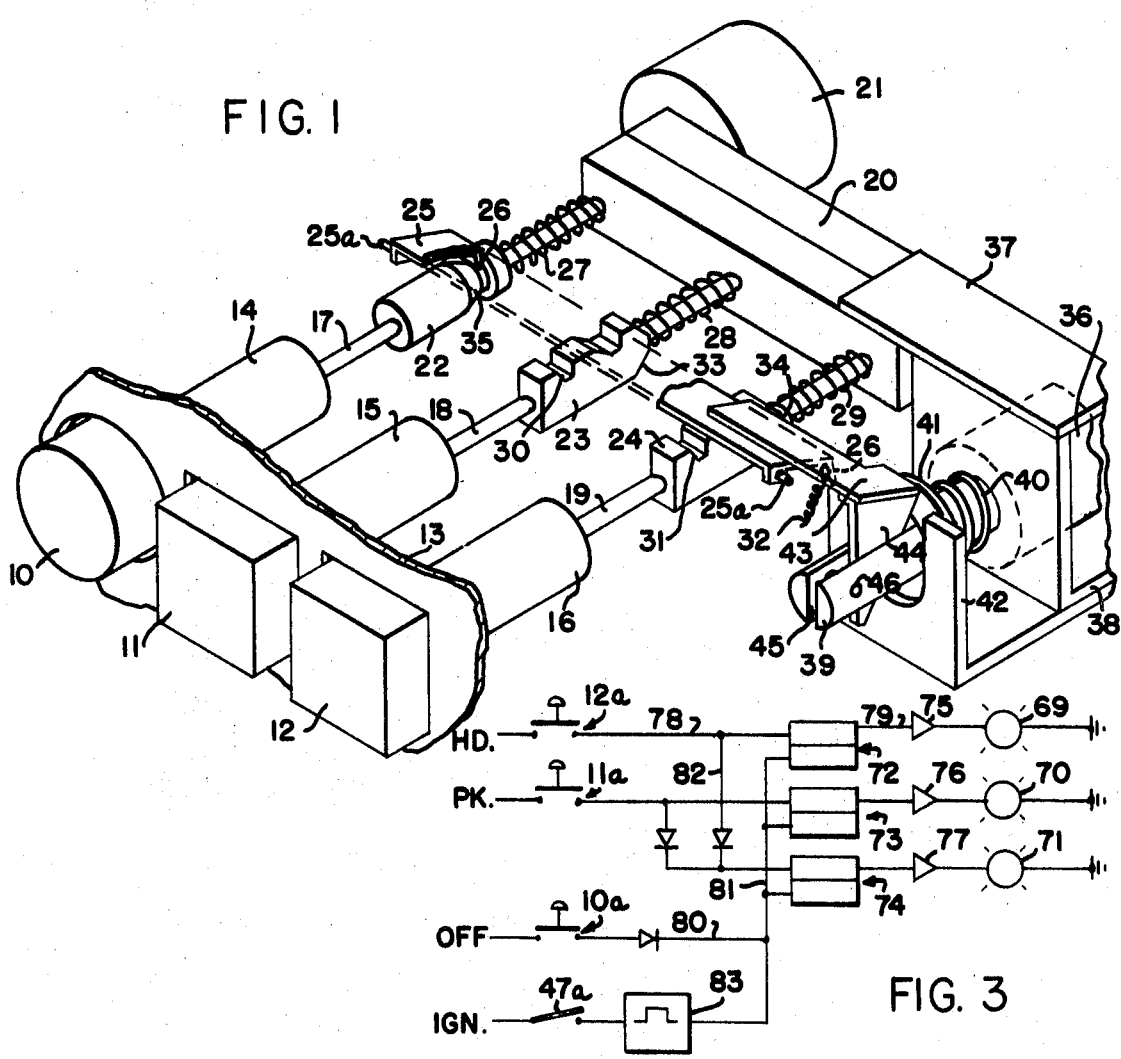
FIG. 1
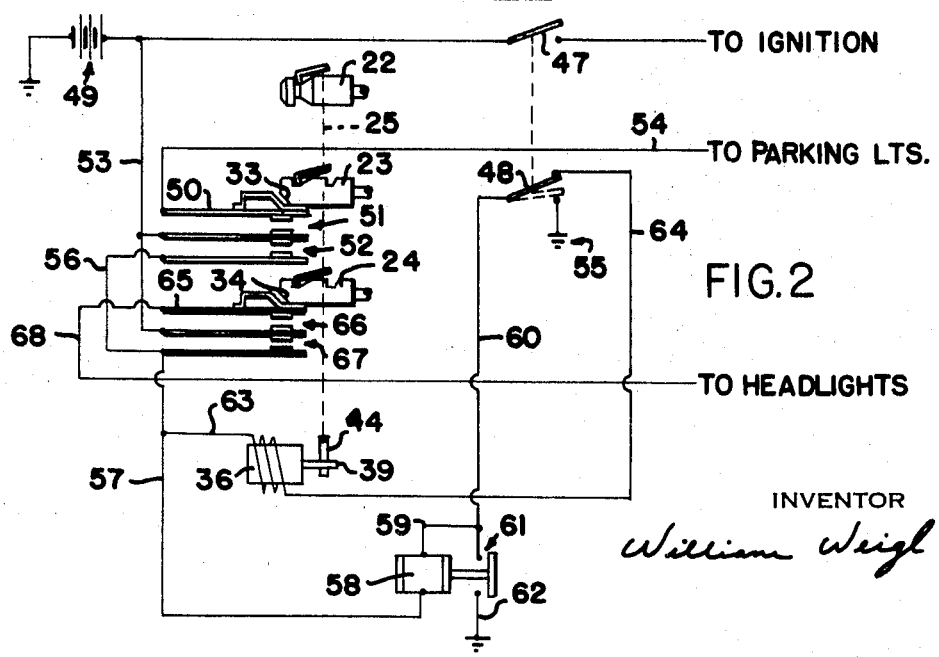
FIG. 3
FIG. 2
INVENTOR
William Weigl

VEHICLE LIGHT CONTROL SYSTEM WITH MEMORY SWITCHING CIRCUIT

This invention is an improvement over that of U.S. Pat. No. 2,862,148 issued to Weigl et al. The invention of the aforesaid patent necessitated the use of specially constructed light switches and/or ignition switches. In addition, the patent disclosed control relays which, if they burned out while driving in the dark, would cause the lights to be turned off.

It is a principal object of my invention to provide a vehicle light control system operable to automatically shut off lights in response to turning off the ignition, and which has a high factor of safety against improper operation.

Another main object of my invention is to provide a vehicle light control system of the type described herein wherein all of the components may be standard items of today's commerce.

More specifically it is an object of the invention to provide vehicle light control by means of pushbuttons for each of the headlights and parking lights, and a separate pushbutton for deenergizing either of these lights.

It is a further object of one form of my invention to provide a pushbutton-operated lighting system for a vehicle in which the energized light may be positively held in energized condition by a latch bar, and which requires releasing of the latch bar either by an "off" pushbutton or by an auxiliary electroresponsive means operated in response to opening of an ignition switch.

Another object of the invention is to provide an electronic control system for the headlights and taillights of an automotive vehicle in which the electronic components of the control circuitry comprise memory devices which are highly reliable in maintaining their actuated condition.

Other objects and advantages will be apparent from the following description in which reference is made to the accompanying drawings.

In the drawings:

FIG. 1 is an enlarged, fragmentary isometric view of one type of pushbutton device including mechanical components which may be utilized with the present invention.

FIG. 2 is a schematic wiring diagram illustrating the control circuitry employed with the modification of FIG. 1.

FIG. 3 is a schematic wiring diagram of an electronic the push-pull circuit showing an alternative form of the invention.

Most present day automotive vehicles employ a light switch of the push-pull type, having three separate positions. When pushed in to the dashboard, the light switch is adapted to be "off," and none of the exterior lights are energized. When pulled to a first or intermediate "out" position, the white or amber front parking lights and the red rear taillights are energized. When the light switch is pulled to its second or outermost position, the headlights at the front and the red taillights of the vehicle are energized. Also, as an added safety factor on most American automobiles built during the last few years, when the headlights are turned on, the front parking lights are also energized. The present invention contemplates either the energization of the front parking lights when the headlights are on, or having such front parking lights selectively "on" or "off" when the front headlights are "on."

Referring now to FIG. 1, a pushbutton 10 corresponds to the "off" position of the conventional push-pull type switch and will be called hereinafter the off button. Additionally, pushbuttons 11 and 12 correspond to the intermediate and outermost positions of the conventional push-pull type switch, and are designated the parking light button and the headlight button respectively. Preferably, they are recessed in the control panel 13 on the dashboard of the vehicle, and are commonly located to the left of the steering column for ease of operation by the driver. The push buttons may be arranged in any manner, and preferably are located horizontally close together so that on occasions where two buttons are to be actuated in rapid sequence, this may be accomplished simply by using different fingers. An example of this is where one wishes to use the accepted signal to an oncoming vehicle that his headlights have been left on, by quickly pushing buttons 12 and 10, one after the other. Preferably, each of the buttons 10, 11 and 12 has a bulb housing 14, 15 and 16 respectively, in which may be mounted a bulb to illuminate the translucent faces of their respective pushbuttons to indicate the condition of the exterior lights. For purposes of simplicity, the circuitry for lighting the buttons 10, 11 and 12 has been purposely omitted, since such will be apparent to one skilled in the art. Preferably, I wish to light the face of the button 10 with white light when all of the exterior lights are off, so that is an immediate darkness situation, such as upon entering a tunnel, there is a visual indication of the location of the pushbuttons. When the parking lights are energized by pushing in button 11, I prefer to illuminate the face of the button in amber light while simultaneously extinguishing the while light at the face of the off button 10. Additionally, when the button 12 is pushed in for headlight operation, I prefer that its face be illuminated in red, also with while light at the off button 10 being extinguished. The operator can therefore determine the existing condition of his exterior lights at any time by viewing the buttons 10, 11 and 12.

The mechanical system of pushbuttons illustrated in FIG. 1 may be of any type, and should have light switches capable of carrying the current load of the lighting system of the vehicle. For purposes of illustration, the system herein is one utilizing leaf spring-type contacts. The pushbuttons 10, 11 and 12 are mounted on rods 17, 18 and 19 respectively, the ends of which are recessed in a bar 20. Rods 18 and 19 are restrained against rotation and therefore have merely a straight line in-and-out movement. Rod 17, however, in addition to an axial movement, is also capable of rotation in order that a combined rheostat and dome light switch, illustrated simply at 21, may be used to control dimming of the dashboard lights and controlling the cabin dome lights of the vehicle. The combined switch 21 may be identical to those used with conventional push-pull type switches. To enable this, button 10 extends outwardly from the control panel 13 a distance further than the other buttons, so that it may be gripped by the fingers and rotated for the purposes mentioned. Rods 18 and 19 carry members 23 and 24 respectively, which contain notches to cooperate with a latch bar 25 extending perpendicularly to the rods and the notched members 23 and 24, so as to be engageable with the notches therein. It will be noticed that rod 17 carries a member 22 which is cylindrical so as to enable rotation of the off button 10 to operate the rheostat and dome light switch 21. Member 22 is not notched and therefore will not stay in when button 10 is depressed.

The latch bar 25 has a lip 26 adapted to act as a detent to engage the notches in members 23 and 24. This can be seen from FIG. 2. Each of the rods 17—19 is biased outwardly of the control panel 13 by springs 27, 28 and 29 respectively. Whenever the lip 26 of the latch bar 25 permits, the springs 27—29 will move their respective buttons to their outward positions which correspond to the off condition of the lights. Each of the members 22—24 includes an inclined surface which acts to cam the lip 26 upwardly to release any previously held-in rod. The notches in the members 23 and 24 are designated 30 and 31 respectively. The latch bar 25 has its lip 26 dropped into the notches 30 and 31 when the respective pushbutton 11 or 12 is pushed in. A spring 32 mounted on a frame (not shown) of the pushbutton assembly urges the lip 26 downwardly as shown in FIG. 1. The mechanism that has been described thus far is conventional, and therefore has not been elaborated on in any great detail. The only portion not available as an off-the-shelf shelf item is the combined rheostat and switch 21.

The notched members 23 and 24 have inclined cam surface 33 and 34 respectively, which are provided to close electrical contacts in energize the appropriate lights to be operated. It will be seen, that if the pushbutton 11 had been depressed to operate the parking lights, and thereafter the headlights are to be turned on by depressing the button 12, the latch bar 25 will raise upwardly. The inclined surface on the notched member 24 will cause the notched member 23 to be released and have its spring 28 return the pushbutton 11 to its outward position. At the completion of the inward movement of the pushbutton 12, the spring 32 will cause the lip 26 to drop into the notch 31 and hold the headlights in their operative condition until the pushbutton 12 is again permitted to be returned outwardly by its spring 29. If either or both of the buttons 11 and 12 are "in" and the off button 10 is pushed in, its conical cam surface 35 of the member 22 sill cause the lip 26 to be released from either or both of the notches 30 and 31. Pushbutton of this type may either be provided with blocking means (see, for example, U.S. Pat. 3,395,590) within the bar 20 to enable only one of the pushbuttons to be depressed at a time, or may be absent such blocking means to enable two or more buttons to be depressed at one time. I prefer that the apparatus of FIG. 1 be such that both buttons 11 and 12 may be depressed simultaneously and the latch bar 26 hold both notched members 23 and 24 in depressed condition. While this is optional, it appears to have a desirable advantage, i.e., to enable the parking lights to be operated as an additional safety factor in the event one of the headlights may have burned out. Until there is an opportunity to repair the burned-out headlight, approaching vehicles can at least see the width of the vehicle by noting the headlight and front parking light on one side of the vehicle, and the parking light alone on the other side. In those instances where it is necessary according to law to have the front parking lights on whenever the headlights are on, this can be accomplished by connecting the front parking lights for operating with the headlights upon depressing button 12. In such instance, it is desirable that blocking means be provided within bar 25 to permit only one of pushbuttons 11 or 12 to be depressed at a time.

In the aforementioned U.S. Pat. 2,862,148, there is provided a solenoid which is operated in response to a control circuit whenever the ignition switch is turned off. A solenoid 36 is shown herein in the FIG. 1 modification to accomplish the same general objective. The solenoid is mounted on the pushbutton assembly by means of a flat plate 37 and a bracket 38. The solenoid has a rod 39 which is normally urged leftwardly as viewed in FIG. 1, by a spring 40 which pushes against a washer 41 and is restrained by a bracket 42 connected to bracket 38. The bracket 42 has a U-shaped recess to permit passage of the extremity of the rod 39 therethrough. Carried on the latch bar 25 is a plate 43 which has depending therefrom a lever 44 which enters into a slot 45 in the rod 39. A pin 46 passes through the end of the rod 39 perpendicularly to the slot 45, and is adjusted to engage the edge of the lever 44 and move it rightwardly as shown in FIG. 1 upon energization of the solenoid 36. It will be seen that this operation functions to pivot and thereby lift the latch bar 25 with its lip 26 from any notch 30 or 31 with which it may be engaged, thereby enabling the respective pushbutton to be returned to its outward position by its spring 28 or 29 and thus extinguish the lights previously energized. The latch bar 25 pivots on pins 25a. The solenoid, its mounting, and its interconnection with the latch bar 25 are all off-the-shelf items which can be purchased as standard components.

The schematic wiring diagram of FIG. 2 preferably employs a special ignition switch which has additional contacts 48 to provide a highly reliable and safe relay control circuit. It should be understood however, that I may use a conventional ignition switch, and use the control system as shown in U.S. Pat. 2,862,148 in place of the contacts 48. For purposes of safety, however, I prefer the addition of contacts 48. A battery 49 is connected to the ignition switch 47, and a lead extending rightwardly therefrom goes to the ignition system of the vehicle.

To operate the parking lights of the vehicle, I depress the pushbutton 11 to move the notched member 23 to the left as shown in FIG. 2, causing its inclined cam surface 33 to engage a leaf spring 50 carrying contacts 51 and 52, both of which are closed when the notched member moves sufficiently far to the left to cause the lip 26 of the latch bar 25 to drop into the notch 30 in the member 23. At that time, current flows along lead 53 through the now-closed contacts 51 and through a lead 54 to the parking lights, both the amber or white lights at the front of the vehicle and the red taillights at the rear of the vehicle. If the vehicle is now to be operated with the parking lights on, the ignition switch 47, and the contacts 48 are closed and the vehicle may be driven with the parking lights on.

On operating the ignition switch to its on condition, the contacts 48 move to their dotted-line position and establish a connection with ground 55. At this time, current will flow through lead 53, contacts 52, lead 56, lead 57, the coil of a relay 58, lead 59, lead 60, and the connection of contacts 48 with ground 55. This causes relay 58 to be energized which in turn closes its contacts 61, thereby establishing a holding circuit through a lead 62 to ground. Relay 58 remains energized for the entire period that the condition exists that either the headlights or parking lights and the ignition switch are on. Note however, that it required both the ignition switch and one set of lights to be turned on before the relay 58 became energized. This means that under normal daylight driving, the relay 58 is not energized, since it requires the closing of contacts 52 or a corresponding contact of the headlights in order to permit current to flow through lead 57.

It is not infrequent for a person driving under conditions where it is sufficiently light to see the road and other vehicles adequately, to put his parking lights on while driving, in order that others may see him. To eliminate the need for his having to remember that he energized the parking lights, which sometimes he may forget since it is difficult to notice this condition from the illumination of the dashboard, the control system herein is adapted to automatically shut off the parking lights. If desired for any reason, they can be restored by merely pushing in button 11 again, but the lights are then totally independent of the ignition system. When the ignition switch 47 is opened after the vehicle is stopped, the contacts 48 connected to the ignition switch return to their full-line position, breaking the circuit to the ground 55. Relay 58 momentarily remains held-in by its connection to lead 62 to ground. When contacts 48 are restored to their full-line position, current will flow through lead 53, closed contacts 52, lead 56, and lead 63 to the coil of solenoid 36, then through lead 64, across contacts 48, lead 60, closed contacts 61 and lead 62 to ground. This permits solenoid 36 to be energized, thus moving he lever 44 to the position to actuate latch bar 25 to cause its lip 26 to be removed from the notch 30 and thereby permit spring 28 to return the pushbutton 11 to its outer or off condition. As it moves to its off position, contacts 51 and 52 are reopened, the former disrupting the light circuit and the latter breaking current flow through the lead 56 to the solenoid 36 and relay 58 Relay 58, upon deenergization, opens its contacts 61, thus resetting the entire circuitry for subsequent operation. If the operator wishes to return his parking lights to the on condition, he can merely operate pushbutton 11, reclosing contacts 51 and 52. Contacts 51 reestablish the lights, but there is no possibility of operating the relay 58 or the solenoid 36 until the ignition switch 47 is again closed to cause contacts 48 to return to their dotted line position and reestablish the controls as previously mentioned. It will be noted that, if the parking lights are on when the operator next gets into the vehicle and starts the ignition, he will repeat the same operation as before and on his second stop, the opening of the ignition switch 47 will again shut off the lights.

The operation of the headlights in response to pushing in of the button 12 is indentical in function to that previously described for the parking lights. When the notched member 24 is moved leftwardly as shown in FIG. 2, it engages an inclined cam surface on a leaf spring 65 which carries contacts 66 and 67. Closing of contacts 66 establishes a circuit to the headlights through lead 53, closed contacts 66, and lead 68 to the headlights. When the headlights alone are to be energized, as is sometimes necessary, they can be operated independently of the ignition and any of the control circuitry described. There are emergency conditions under which the headlights are to be left on with the ignition switch open, such for example, when the vehicle cannot start. In addition, there are times when the headlights are desired for illumination of an area, even though the ignition is off. If the ignition switch 47 is closed however, contacts 48 connected to the ignition switch move to their dotted line position and the control circuitry will be set for subsequent automatic operation to extinguish the headlights when the ignition switch is again opened. Setting of the circuit is accomplished by current passage through lead 53, now-closed contacts 67, lead 57 to the coil of relay 58, and leads 59, 60 and the now-closed contacts 48 to ground 55. This energizes relay 58, closing its contacts 61, and establishes the holding circuit as described previously. Subsequent opening of the ignition switch 47 causes contacts 48 to be restored to their full-line position as shown in FIG. 2, thus causing energization of solenoid 36 through contacts 67, lead 63, lead 64, contacts 48, lead 60, contacts 61 and lead 62 to ground. This in turn causes the solenoid rod 39 to be pulled leftwardly as viewed in FIG. 2 to operate lever 44 to release latch bar 25 and enable the pushbutton 12 to move outwardly of the control panel 15 and break not only the control circuit but also current to the headlights. In the event the ignition switch is turned on first, the headlights are thereafter to be turned on, either right after the vehicle is started or at any time while driving, the control circuitry will function identically with that previously described. Relay 58 is only energized when both the ignition switch and when one or both of the light switches are operated to their on condition, and sets the system for automatic actuation by the solenoid 38 to cause the lights to be extinguished. Additionally, at any time while driving, the exterior lights can be operated anywhere between its off, parking light, or headlight condition, in any desired order, and as frequently as desired. This provides for manual operation of the lights at any time, in addition to providing for automatic shut off of the lights when the ignition switch is opened. It therefore provides everything that is presently accomplished with existing light controls, plus the addition of the automatic shut off.

Referring now to FIG. 3, an electronic modification of the invention is disclosed as having "off," "parking light" and "headlight" pushbuttons 10a, 11a and 12a corresponding in function to 10, 11 and 12 of FIGS. 1 and 2, except that it is preferable that these pushbuttons be of the momentary contact type. They are normally biased to the off condition in which they are shown, and when depressed, merely establish contact, which is broken upon release of the operated button. The exterior lights are represented by white headlights 69, amber front parking lights 70, and red taillights 71. The control circuit includes flip-flops 72, 73 and 74 for the headlights, parking lights and taillights respectively, along with amplifiers 75, 76, and 77. To turn on the headlights, button 12a is depressed momentarily, to provide an input signal to lead 78 to turn flip-flop 72 "on" and cause an output through lead 79, to amplifier 75, for the headlights. Manual shutoff of the headlights is provided by depressing button 10a causing an input along lead 80, lead 81, to turn flip-flop 72 to its off condition to remove the output signal through lead 79, and extinguish the headlights. It will be noted that at the same time the lights 69 were previously turned on, there was also an input through lead 82 to flip-flop 74 thus causing actuation of the red taillights 71 which are common to both the parking lights and headlights.

The parking lights are operated in the same fashion as the headlights, in this case by turning flip-flops 73 and 74 to their on conditions to energize the front amber lights 70 and the red rear taillights 71. They also can be deenergized manually by depressing button 10a which is connected through leads 80 and 81 to the "off" side of each of the flip-flops 72, 73 and 74 to remove any output signal therefrom. To provide the necessary control from the ignition switch, in the form of the invention in FIG. 3, I merely use a "one-shot" switching circuit 83 which performs identically as operation of the off button 10a by restoring any of the flip-flops 72—74 to their non-output conditions on opening of the ignition switch. The "one-shot" provides a single pulse only upon opening of the ignition switch 47a but has an affect on closing the ignition switch. While I have shown flip-flop circuitry, it is obvious the other solid state versions of the invention are possible. For example, silicon controlled rectifiers, (SCR's), can be used, enabling possible elimination of the amplifiers 75—77.

For purposes of simplicity, I have not described herein those things such as a time delay circuit which may enable the automatic shut-off to take place, but only after a predetermined time delay. Obviously, such features can be included without departing from the spirit and scope of the present invention.

I claim:

1. In a vehicle having an ignition system and an exterior lighting system including parking lights and headlights:
   a. an ignition switch manually operable between "ignition on" and "ignition off" condition;
   b. a first manually operable pushbutton including a switch for operating said parking lights, said first pushbutton being biased toward an "off" condition;
   c. a second manually operable pushbutton including a switch for operating said headlights, said second pushbutton being biased toward an "off" condition;
   d. means maintaining said parking lights and headlights energized upon operation of the respective push buttons therefor to an "on" condition;
   e. a third manually operable pushbutton including means responsive to actuation thereof for operating said maintaining means to extinguish either said parking lights or headlights irrespective of the condition of said ignition switch; and,
   f. means responsive to operation of said ignition switch from "ignition on" to "ignition off" condition for operating said maintaining means to extinguish said parking lights or said headlights in the event either is energized at the time said ignition switch is so operated.

2. The invention set forth in claim 1 wherein said means responsive to operation of said ignition switch comprises an electrical memory circuit settable in response to closing of said ignition switch and energization of at least one of said parking lights or headlights.

3. The invention set forth in claim 2 wherein said memory circuit comprises a single electroresponsive means energizable only in response to operation of said ignition switch and at least one of said parking light or headlight switches to their "on" conditions, and deenergizable in response to operation of the ignition switch to its "ignition off" condition.

4. The invention set forth in claim 1 wherein each of said parking light pushbutton and said headlight pushbutton are provided with a latching means, and wherein said maintaining means comprises said latching means and a latch bar biased toward latching position and engageable with both said latching means, said third pushbutton including a member associated therewith for operating said latch bar toward unlatching position to enable either said first or second pushbutton to be biased to its "off" condition.

5. The invention set forth in claim 4 wherein said means responsive to operation of said ignition switch includes an electroresponsive member for moving said latch bar in opposition to its biasing means.

6. In a vehicle having an ignition system and an exterior lighting system including parking lights and headlights:
   a. an ignition switch manually operable between "ignition on" and "ignition off" conditions;
   b. a parking light switch;
   c. a headlight switch;
   d. a first manually operable switch actuator actuator operating said parking light switch including means biasing said actuator toward switch-deenergizing condition;
   e. a second manually operable switch actuator for operating said headlight switch including means biasing said second actuator toward switch-deenergizing condition;
   f. a latching member including means biasing said member toward a latching position;

g. means on each of said actuators cooperating with said latching member to latch an actuator in light-energizing condition upon manual operation thereof to such condition;
h. electrical control means;
l. first manually operable means for moving said latching member to a latch-releasing position; and,
j. electrically-operated second means responsive to said control means whenever said ignition switch and either of said light switches were immediately previously simultaneously energized, for moving said latching member to latch-releasing position upon operation of said ignition switch to "ignition off" condition.

7. The invention set forth in claim 6 wherein said electrical control means comprises a memory circuit associated with said ignition system and said headlights and parking lights for controlling operation of said electrically-operated second means, said memory circuit comprising a single electroresponsive means energizable only in response to operation of said ignition switch and at least one of said parking lights or headlights to their "on" conditions and deenergizable in response to operation of said ignition switch to its "ignition off" condition.

8. In a vehicle having an ignition system and an exterior lighting system:
a. a source of electrical energy;
b. an ignition switch manually operable between "ignition on" and "ignition off" condition;
c. a light switch for said exterior lighting system including a manually-operable switch actuator therefore including means biasing said actuator toward switch-deenergizing condition;
d. an electronic memory device operable to produce an output upon manual operation of said switch actuator to connect said exterior lighting system to said source of energy and maintain said system in energized condition; and,
e. means interconnecting said ignition switch with said memory device and providing an output signal only upon operation of said ignition switch to its "ignition off" condition to cause said memory device to disconnect said exterior lighting system from said source of energy.

9. The invention set forth in claim 8 wherein said switch actuator includes a momentary contact button, and wherein there is also provided an additional momentary contact button electrically connected to said memory device to cause said device when said button is actuated to disconnect said exterior lighting system from said source of energy.

10. The invention set forth in claim 8 wherein said exterior lighting system includes headlights, front parking lights, and rear taillights energizable in response to operation of either said headlights or taillights, and wherein said memory device is connected to said taillights.

UNITED STATES PATENT OFFICE
CERTIFICATE OF CORRECTION

Patent No. 3,569,774      Dated March 9, 1971

Inventor(s)    William Weigl

It is certified that error appears in the above-identified patent and that said Letters Patent are hereby corrected as shown below:

Column 1, lines 43 and 44, cancel "the push pull". Col 2, line 17, "while" should read -- white --. Column 6, line "an" should read -- no --; line 3, "the" should read -- that Signed and sealed this 7th day of March 1972.

(SEAL)
Attest:

EDWARD M. FLETCHER, JR.                  ROBERT GOTTSCHALK
Attesting Officer                          Commissioner of Pate